United States Patent [19]

Tong et al.

[11] Patent Number: 5,422,410
[45] Date of Patent: Jun. 6, 1995

[54] METHOD FOR INCREASING THE MOLECULAR WEIGHT OF THERMOPLASTIC POLYMERS OF MONOALKENYL ARENES

[75] Inventors: Wen-Hong Tong, Midland; Janet M. Goss, Saginaw; Jeffrey R. Montanye, Midland, all of Mich.

[73] Assignee: The Dow Chemical Company, Midland, Mich.

[21] Appl. No.: 203,841

[22] Filed: Feb. 28, 1994

Related U.S. Application Data

[63] Continuation of Ser. No. 966,793, Oct. 27, 1992, abandoned.

[51] Int. Cl.⁶ ............................................. C08F 212/32
[52] U.S. Cl. ................................... 526/284; 526/280; 528/481; 528/503
[58] Field of Search .............. 526/284, 308, 280; 528/481, 503

[56] References Cited

U.S. PATENT DOCUMENTS

| | | |
|---|---|---|
| 4,622,375 | 11/1986 | Wong . |
| 4,667,004 | 5/1987 | Wong . |
| 4,667,005 | 5/1987 | Wong . |
| 4,687,815 | 8/1987 | Wong . |
| 4,698,394 | 10/1987 | Wong . |
| 4,708,990 | 11/1987 | Wong et al. . |
| 4,722,974 | 2/1988 | Wong . |
| 4,724,260 | 2/1988 | Kirchhoff et al. . |
| 5,034,485 | 7/1991 | Tong et al. . |
| 5,077,367 | 12/1991 | Campbell, Jr. et al. . |

FOREIGN PATENT DOCUMENTS

| | | |
|---|---|---|
| 0227124A2 | 9/1986 | European Pat. Off. . |
| 0425814A1 | 9/1990 | European Pat. Off. . |

OTHER PUBLICATIONS

Unted States Patent application Ser. No. 872,334 filed Jun. 9, 1986 by Stephen F. Hahn et al. entitled Polymers From Unsaturated Alkyl Arylcyclobutene Monomers.

*Primary Examiner*—Fred Teskin
*Attorney, Agent, or Firm*—Charles J. Enright

[57] ABSTRACT

The invention is a process for making high molecular weight polymers of monoalkenyl arene monomers comprising:
1) copolymerizing vinylbenzocyclobutene with the monoalkenyl arene monomer through the vinyl moiety;
2) submitting the thus formed copolymer to conditions sufficient to open the side rings of the benzocyclobutene moieties;

wherein the amount of vinylbenzocyclobutene in the copolymer is such that the polymer formed by step 2) does not reach a gel point. Such copolymers allow the building of molecular weight after the initial polymerization.

10 Claims, No Drawings

METHOD FOR INCREASING THE MOLECULAR WEIGHT OF THERMOPLASTIC POLYMERS OF MONOALKENYL ARENES

CROSS REFERENCE TO RELATED APPLICATION

This is a continuation of application Ser. No. 07/966,793, filed Oct. 27, 1992, now abandoned.

FIELD OF THE INVENTION

This invention relates to monoalkenyl arene polymers such as polystyrene and to a method for increasing the molecular weight of said polymers.

BACKGROUND OF THE INVENTION

A process is disclosed in U.S. Pat. No. 4,708,990 wherein a living polymer of the alkenyl type is end-capped with an arylcyclobutene monomer end-capping agent. Secondary polymerization of the polymer can then be induced by heating.

U.S. Pat. No. 5,034,485 discloses a polymeric composition produced by the reaction of, for example, styrene in a free radical polymerization reaction which is initiated by a cyclobutarene peroxide, wherein the cyclobutarene fragments are incorporated into the polystyrene polymer. A further polymeric product can be produced from the polymeric composition of the free radical polymerization by ring opening polymerization of the cyclobutarene moiety to produce branched, crosslinked or a mixture of branched and crosslinked polymers. The use of this technique requires the synthesis and use of the cyclobutarene peroxide.

U.S. Pat. No. 4,724,260 discloses polymeric compositions comprising in polymerized form, a monomer containing a polymerizable arylcyclobutene moiety, and a polymerizable unsaturated alkyl moiety; wherein the monomer is polymerized by subjecting it to conditions sufficient to polymerize the unsaturated alkyl moiety. A related disclosure in U.S. Ser. No. 872,334 exemplifies copolymers of vinylbenzocyclobutene and styrene.

U.S. Pat. No. 4,698,394 discloses a solid random copolymer comprising from about 99.99 to about 80 mole percent of a monoalkenyl arene monomer and from about 0.01 to about 20 mole percent, based on total moles of incorporated monoalkenyl arene monomer and olefinic benzocyclobutene monomers, an olefinic benzocyclobutene of the formula:

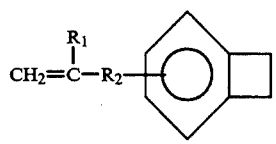

where $R_1$ is hydrogen or $CH_3$ and $R_2$ is $(CH_2)_n$ where n is 0 to 6. Copolymers of vinylbenzocyclobutene and styrene are exemplified.

EP Publication 0425814 discloses syndiotactic homopolymers of an arylcyclobutene functional monomer and syndiotactic copolymers of an arylcyclobutene functional monomer and a vinylaromatic monomer are prepared by polymerizing the monomers in the presence of a catalytic amount of a suitable coordination catalyst such as the reaction product of polymethylaluminoxane and a transition metal compound. Copolymers of styrene and 3-vinylbenzocyclobutene exemplified are insoluble in o-dichlorobenzene after the side rings of the arylcyclobutene are opened and crosslinked.

High molecular weight polystyrene has improved creep resistance, elasticity, higher heat distortion, lower permanent set, higher flexural, and impact strengths. This improves its utility for molding objects which require impact resistance and the ability to bend without breaking. High molecular weight polystyrene is generally accepted to be polystyrene with a molecular weight of above 300,000.

One may increase the molecular weight of a polystyrene by the methods disclosed in U.S. Pat. Nos. 4,698,394 and 4,724,260. When the copolymers of vinylbenzocyclobutene and styrene taught therein are heated the side rings of the benzocyclobutenes open and react with each other. This increases the polystyrene molecular weight. However the levels of benzocyclobutene taught convert the polymers to thermosets. That is they crosslink at such a density that their melt viscosity at normal process temperature levels is too high to be useful. They also become insoluble in solvents and may even gel in the polymerization reactor.

The gel point or gel state is described in the *Concise Encyclopedia Of Polymer Science And Engineering*; Wiley Interscience, 1990, pp. 430–2, which is incorporated herein by reference. The gel point describes a critical point in the polymerization from a monomer to a fully cured polymer. The liquid polymer before the gel point is called a sol because it is soluble in good solvents. The solid polymer beyond the gel point is called a gel. It is not completely soluble, even in a good solvent. However low molecular weight fractions (sol fraction) may still be extractable.

Preferably the gel point is defined as that point wherein one part of polymer will not completely dissolve after contact with one hundred parts of methylene chloride at 25° C. for fifteen minutes.

One may increase the molecular weight of a polystyrene made in a given reaction by lowering the polymerization temperature. The polymer has more desirable properties but the amount of polystyrene made in a given reactor is reduced because of longer polymerization times required at lower temperatures.

It would be desirable to increase the molecular weight of a alkenyl arene polymer such as polystyrene without forming a thermoset or gels and without reducing the capacity of the polystyrene polymerization reactor.

While arylcyclobutene and cyclobutarene are both used to represent the same moiety the term cyclobutarene is more correct since the 'cyclobutene' side ring is saturated. Both terms are commonly used by the artisan and understood to have the same meaning.

SUMMARY OF THE INVENTION

The invention is a process for making high molecular weight polymers of monoalkenyl arene monomers comprising:

1) copolymerizing vinylbenzocyclobutene with the monoalkenyl arene monomer through the vinyl moiety;

2) submitting the thus formed copolymer to conditions sufficient to open the side rings of the benzocyclobutene moieties;

wherein the amount of vinylbenzocyclobutene in the copolymer is such that the polymer formed by step 2) does not reach a gel point.

In another aspect this invention is the high molecular weight polymer formed by said process.

In another aspect this invention is an article containing a component that contains a high molecular weight polymer formed by said process.

A feature of this invention is that the fraction of the benzocyclobutene moieties in the polymer is low enough that gels do not form.

An advantage of this invention is that the high molecular weight may be formed by a process separate from the polymerization process of the monoalkenyl arene monomer. Throughput may be maintained in the polymerization reactor. The formation of higher molecular weight may be delayed until polymer recovery such as in the devolatilizer, extruder or even later. These advantages may be achieved without the formation of a polymer that is crosslinked to the point of becoming insoluble in good solvents for polymers of the base monoalkenylarene, without the use of anionic polymerization and without the use of special cyclobutarene initiators.

DETAILED DESCRIPTION

The polymers produced by the processes of this invention, the polymeric compositions and the polymeric products have a wide variety of uses as films and sheets, as molded and shaped articles and in the form of various foamed materials with useful properties such as insulation. The high molecular weight makes the polymers particularly useful as jewel boxes, e.g. cassette tape, videocassette or compact disc boxes.

In addition to the reactive components of the reaction mixture, inert additives, reinforcing aids, glass fibers, woven and nonwoven cloth, fillers, pigments, impact modifiers, etc. may be included if desired. Such additives may be incorporated with the polymer in a dry or molten form.

The vinylbenzocyclobutene functional monomers useful in this invention contain a benzene moiety having a pair of adjacent ring carbons thereof covalently bonded to a 1,2-ethanediyl group. The 1,2-ethanediyl group together with the 2 aromatic carbons of the aryl group collectively form a four membered ring system having some physical properties similar to a cyclobutene group, thereby resulting in the title "benzocyclobutene".

The vinyl group in the monomer is a polymerizable functional group which may suitably be polymerized or copolymerized with the monoalkenyl arene monomer. The vinyl group is preferably bonded to the monomer at a meta position from one of the aryl carbon atoms from the four membered ring system.

The preferred monomer, 3-vinylbenzocyclobutene, can be prepared by contacting an amount of 3-bromobenzocyclobutene with ethylene in a pressurized reactor in the presence of a palladium (II) acetate catalyst and a cocatalyst such as tri-o-tolylphosphine, and an appropriate base. 3-vinylbenzocyclobutene can be extracted in a suitable solvent. An exemplary process is disclosed in U.S. Pat. No. 4,724,260 which is incorporated herein by reference. 3-bromobenzocyclobutene may be formed by the process described in U.S. Pat. No. 4,822,930 which is incorporated herein by reference.

The 3-vinylbenzocyclobutene is represented by the formula:

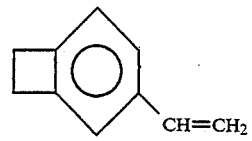

Suitable monoalkenyl arene monomers which can be used in the process of the present invention include those represented by the formula:

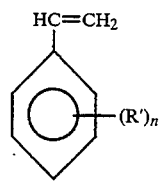

wherein each $R'$ is independently an aliphatic, cycloaliphatic or a fused aromatic hydrocarbon group having from 1 to 10, more suitably from 1 to 6, most suitably from 1 to 4, carbon atoms; or a halogen atom; and n is an integer from zero to five, more preferably zero or one and most preferably zero. Examples of such monomers include, styrene, methylstyrenes such as 4-methylstyrene, propyl styrenes such as 4-propyl styrene, vinylnaphthalenes such as 1-vinylnaphthalene cyclohexylstyrenes such as 4-cyclohexylstyrene, halostyrenes such as 4-chlorostyrene, 4-bromostyrene, etc., with styrene being especially suitable.

Acyclic conjugated dienes containing 4-8 carbon atoms may be copolymerized with the monoalkenylarene monomer. Suitable conjugated diene monomers are 1,3-butadiene, 2,3-dimethyl-1,3-butadiene, piperylene3-butyl-1,3-octadiene, isoprene, 2-phenyl-1,3-butadiene and the alkyl and halo derivatives thereof.

The copolymers of the monoalkenyl arene and vinylbenzocyclobutene are prepared by subjecting the monomers to conditions sufficient to polymerize them through the vinyl groups. In general the polymerization conditions appropriate to styrene will also be appropriate for this copolymerization. One needs to be aware that the side rings of the benzocyclobutene moiety open and react at temperatures above about 180° C. and so temperatures above that are to be avoided at least until the copolymer is ready to be coupled. Conventional free radical and ionic polymerization processes are suitable. Such processes are described, for example, in Schildknecht, *Polymer Processes*, Volume X, 1956; and in Kirk-Othmer, *Encyclopedia of Chemical Technology*, 1985. A preferred free-radical catalyst is DP-275 which is 1,1-bis(t-butylperoxy) cyclohexane. A preferred anionic initiator is an alkyl lithium reagent.

Polymerization may be effected under bulk conditions or in solution,suspension or emulsion techniques comparable to those used for styrene polymerization. Polymerization catalysts may be free radical or anionic types. Suitable free radical initiators include di-tertiary butyl peroxide, azobis(isobutyronitrile), dibenzoyl peroxide, tertiary butyl perbenzoate, dicumyl peroxide and potassium persulfate. Suitable anionic initiators include methyl lithium, ethyl lithium, methyl sodium, propyl lithium, nbutyl lithium, secbutyl lithium, tertbutyl lithium,, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium and the like.

Stereospecific catalysts may be used. Suitable stereospecific catalysts include the Ziegler type, including a transition metal of Group 4A, 5A, 6A or 7, in a valence state lower than its maximum in combination with an organometallic compound of Group 2 or 3.

Suitable reducible transition metal compounds include inorganic compounds such as halides, oxyhalides, complex halides, hydroxides and organic compounds such as alcoholates, acetates, benzoates and acetyl acetonates of the appropriate metals. Appropriate metals include titanium, zirconium, hafnium, thorium, uranium, vanadium, niobium, tantalum, chromium, molybdenum, tungsten and iron. Metal halides, particularly chlorides are preferred. Titanium, zirconium and vanadium are the most active metals. Preferred compounds include titanium tetrachloride, titanium tetrabromide, zirconium tetrachloride, vanadium tetrachloride and zirconium acetyl-acetonate because they are readily reduced.

These compounds may be reduced with, for example, hydrogen or aluminum. Titanium tetrachloride may be readily reduced to titanium trichloride by reduction with hydrogen, aluminum or titanium metal. Suitable reduction methods are disclosed in U.S. Pat. No. 3,362,940.

The other component of the Ziegler catalyst system is at least one organometallic compound of a metal of Groups 2 or 3. Suitable compounds have at least one hydrogen radical such as alkyl, cycloalkyl, aralkyl, alkaryl, or aryl attached to the Group 2 or 3 metal at a carbon atom. Suitable organometallic compounds include triethylaluminum, tripropylaluminum, dipropylzinc, triisobutylaluminum, diethylmagnesium, diphenylaluminum chloride, cyclohexylethylzinc, diethylaluminum bromide, diethylaluminum chloride, diethylaluminum iodide, ethylzinc chloride, propylmagnesiumchloride, dipropylaluminum chloride, dioctylaluminum chloride, diisobutylaluminum hydride, phenylaluminum dihydride, cyclohexylbromoaluminum hydride, dipropylaluminum hydride, propylzinc hydride, ethylmagnesium hydride and methoxyaluminum diethyl. Mixtures of these and like compounds may also be used.

The catalyst may be used in conventional procedures including charging the components separately to the polymerization reactor or by combining them just prior to charging them to the reactor.

The polymerization may be carried out in bulk, in solution, in suspension or in emulsion. Solution polymerization will generally employ inert hydrocarbon solvents such as toluene, benzene, cyclohexane, or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

The polymerization mixture may also be copolymerized with other monomers. The conditions for the copolymerization will, in general be similar to those used for polymerizing the mixture by itself and for copolymerizing styrene. Thus, initiators, temperatures, pressures, solvents, and recovery processes will be similar to those previously described. The types of copolymer produced may include random and graft copolymers. The preparative procedures will be those appropriate to the type of copolymer in question. Preferably, the monoalkenyl arene content will be above 60% weight for such copolymers.

Random copolymers may be made with a wide range of comonomers including other vinyl monomers such as alpha-methyl styrene, acrylates including methyl acrylate, ethyl acrylate, methacrylates including methyl methacrylate, acrylonitrile, olefins especially diolefins such as butadiene, isoprene, chloroprene and monoolefins such as ethylene and propylene.

The pendant benzocyclobutene group of the polymers of the present invention provides a means for providing latent polymerization ability. It is believed, without wishing to be bound thereby, that the pendant benzocyclobutene moiety can ring open thereby forming crosslinked structures or extract a hydrogen moiety from the polymer chain thereby leading to chain coupling.

Generally ring opening is occasioned by heating a mixture comprising the polymers of the present invention to a temperature suitable for effecting the chain coupling reaction. Suitable temperatures may vary depending on the specific benzocyclobutene moiety and the other components of the mixture. Preferred reaction temperatures are from 100° C. to 320° C., more preferably from 150° C. to 250° C. Upon ring opening, coupling or reaction with suitable polymerizable functionality of the remaining ingredients of the reaction mixture readily occurs.

The cyclobutene side ring can also open under exposure to radiation, such as x-ray and electron-beam radiation.

While the second step, side ring opening of the benzocyclobutenes may take place in the polymerization reactor, normally that reactor is run at too low a temperature to achieve significant side ring opening. At least some of the side rings may be opened in the the devolatilization step. Some of the side rings may intentionally be left intact for further processing. Further side ring opening may take place in the extruder or in the molding process or even may be reserved for use of the article containing a component containing the copolymer of the monoalkenylarene monomer and vinylbenzocyclobutene. Such a component may resist deterioration of properties through heat degradation. As polymer chains are broken by heat, molecular weight may concurrently be increased by the side ring opening reaction of the benzocyclobutenes. These two competing reactions may, to some extent, cancel each other out.

In the higher molecular weight copolymer, preferably, at least 50% of the side rings are opened and reacted. More preferably at least 70% of the side rings are opened and reacted. Most preferably at least 90% of the side rings are opened and reacted. The percentage of side rings opened may be determined by measuring the residual heat of polymerization of a sample of the material. A differential scanning calorimeter (DSC) is used to measure the heat of polymerization of the unreacted, base polystyrene and the sample wherein side rings have opened. The percentage reduction in the heat of polymerization is the percent of ring opening. The heat of polymerization may be measured on the copolymer prior to reaction of the side rings or on a standard using the same fraction of vinylbenzocyclobutene in the copolymer and on a portion of the actual sample being tested or on a specimen that has undergone the same polymerization history as the sample.

The following examples are intended to be illustrative only and do not in any way limit the scope of the invention. Unless otherwise noted parts and percentages are by weight.

Preparation of 3-vinylbenzocyclobutene

Into a 450 ml Parr pressure reactor, 100 ml of acetonitrile, and 0.6 g of freshly distilled triethylamine are added. The mixture is purged with nitrogen gas through a sparge tube for 15 minutes to remove air. To the reactor, 0.98 g of 3-bromobenzocyclobutene, 0.04 g of palladium (II) acetate, 0.17 g of tri-o-tolylphosphine are added and the reactor is sealed. The reactor is then pressurized with 250 psig ethylene, and is then vented. The reactor is pressurized with 2 more charges of 250 psig ethylene and is vented after each charge. The vessel is then pressurized to 250 psig ethylene, and held there. The mixture is then heated to 125° C. and is mechanically stirred for 16 hours. The reaction mixture is allowed to cool and the remaining ethylene is vented. The reaction mixture is worked up by washing in 100 ml diethyl ether, and this mixture is washed twice with 100 ml of water, once with 100 ml of 5 percent hydrochloric acid, once more with 100 ml of water, and is then dried over magnesium sulfate. The solvent is removed. The product is analyzed by gas chromatography, and it is determined that approximately 70 percent of the 3-bromobenzocyclobutene is converted to 3-vinylbenzocyclobutene. The reaction mixture is passed through a 100 ml column of silica gel in the presence of hexane as an eluent. The hexane is removed on a rotary evaporator and the product is recovered.

ILLUSTRATIVE EMBODIMENTS

GENERAL STYRENE POLYMERIZATION

The styrene polymerizer is an 85 liter boiling reactor vessel followed by two devolatilizers in series. The temperature in the reactor is controlled at 127° C. by utilizing the latent heat of vaporization to absorb the heat of polymerization. The feed to the reactor is 11.34 kg/hr of 5% ethylbenzene, 250 ppm DP275B initiator (1,1-bis-tertiary butyl peroxycyclohexane), the stated quantity of 3-vinylbenzocyclobutene (3VBCB) and the balance styrene. The reactor holds 75 pounds of reactants and average residence time is three hours. The reactor product is 51% solids which is fed to the first tank type flate plate devolatilizer which runs at 150° C. and 500 mm Hg pressure. Average residence time is five minutes. The product from the first devolatilizer is fed to the second tank type flate plate devolatilizer which operates at 240° C. and 22 mm Hg pressure. Average residence time is ten minutes. The resulting polymer melt is extruded into a water bath to solidify it and is cut into pellets. Because of the elevated temperature in the devolatilizer some of the side rings of the benzocyclobutenes are opened. Generally under these conditions about ten percent of the benzocyclobutene side rings are opened.

In the reactor, 127° C. is a low enough temperature that significant side ring opening of the VBCB does not occur. Side rings open at the 240° C. temperature in the second devolatilizer. At 0.2% VBCB, gels are visible in the product exiting the process and the melt strand breaks frequently. Polymers containing 0.0, 0.05, 0.1 and 0.15% VBCB are made.

Molecular weights of these polymers are measured. The weight average molecular weight Mw is measured by two methods, by size-exclusion chromatography with low-angle laser light scattering and by gel permeation chromatography with differential refractive index detection(GPC). If the benzocyclobutene units are near the center of the polymer chain, a branched polymer will result when two benzocyclobutene units link by opening their respective side rings and coreacting. If the benzocyclobutene units are both near the end of the polystyrene polymer chain a linear chain extended polymer will result. The possibilities are represented by the following reactions wherein ∿∿∿ represents the polystyrene linear polymer chain and ☐ represents either linked or unlinked benzocyclobutene units:

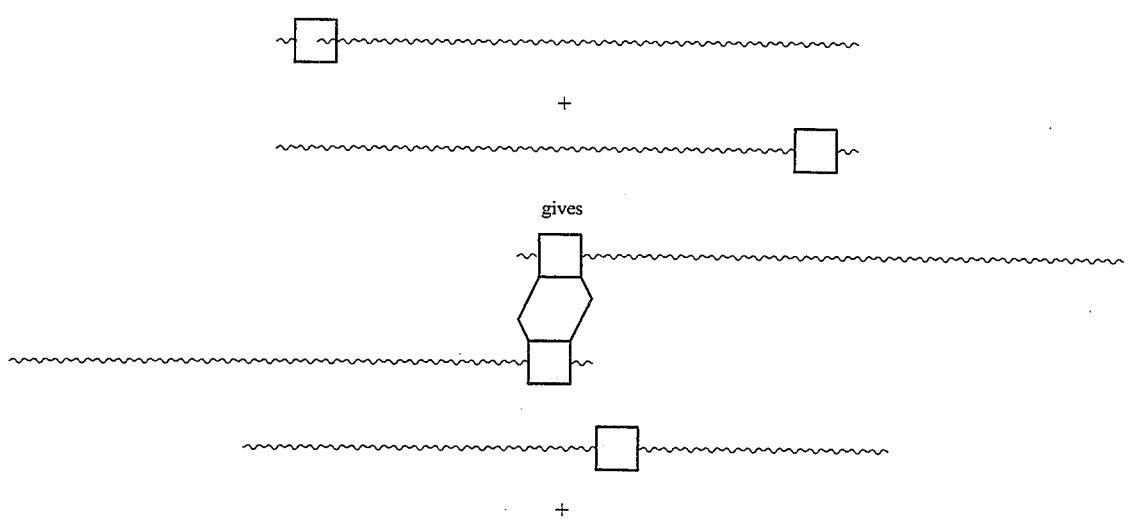

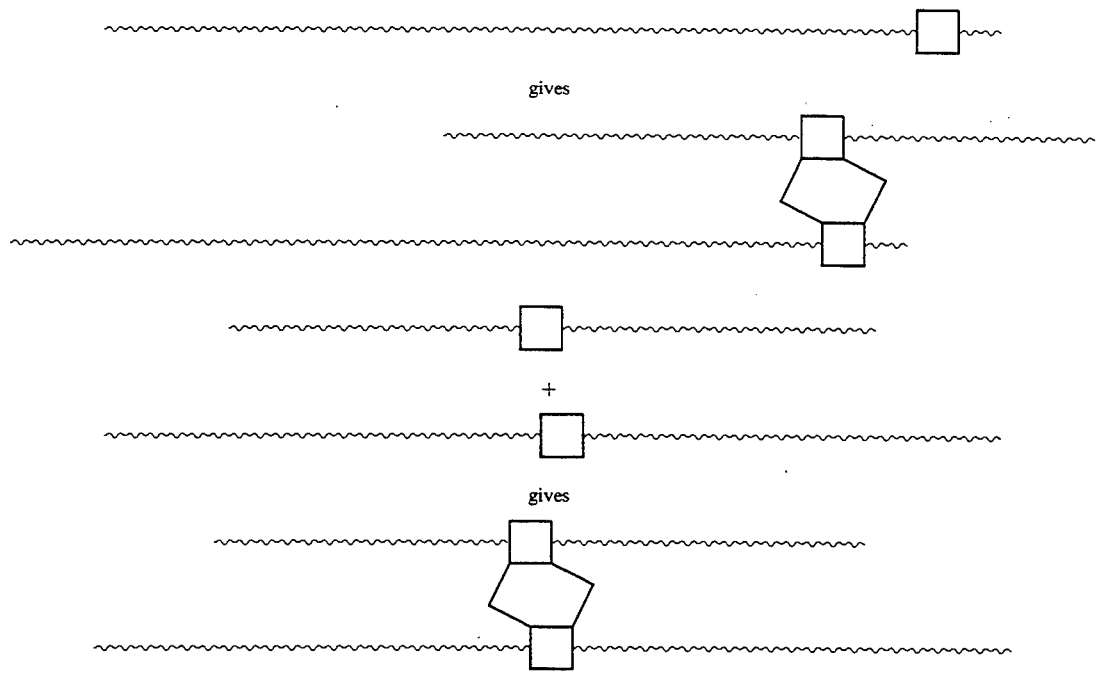

The molecular weights of the polymers made by the GENERAL STYRENE POLYMERIZATION method are measured by conventional gel permeation chromatography (GPC) and are shown in Table I

TABLE I

| | Molecular weights by GPC. | | |
|---|---|---|---|
| WT % VBCB | Mw | Mn | Mw/Mn |
| 0.0 | 284,400 | 107,900 | 2.64 |
| 0.05 | 310,300 | 109,900 | 2.82 |
| 0.10 | 323,000 | 107,000 | 3.02 |
| 0.15 | 353,500 | 109,000 | 3.24 |

The molecular weights of the polymers made by the General Styrene Polymerization method are measured by light scattering and are shown in Table II

TABLE II

| | Molecular weights by light scattering. | | |
|---|---|---|---|
| Wt % VBCB | Mw | Mn | Mw/Mn |
| 0.0 | 327,000 | 167,000 | 1.96 |
| 0.05 | 343,000 | 144,000 | 2.38 |
| 0.10 | 416,000 | 117,000 | 3.56 |
| 0.15 | 574,000 | 202,000 | 2.84 |

Since gel permeation chromatography measures molecular weight by hydrodynamic volume it gives distorted low values for molecular weights of branched polymers.

TABLE III shows the relation of melt flow rate at 200° C. and 5 kg load determined using ASTM Method D-1238 and the weight percent VBCB in the polymer. Molecular weights are also shown.

TABLE III

| | Melt Flow Rates | | |
|---|---|---|---|
| Wt % VBCB | Melt Flow Rate | Mw by Light Scattering 1,000s | Mw by GPC 1,000s |
| 0.0 | 1.81 | 327 | 284.4 |
| 0.05 | 1.86 | 343 | 310.3 |
| 0.1 | 1.47 | 416 | 323 |
| 0.15 | 0.59 | 574 | 353.5 |

Melt flow for a given molecular weight is improved if there is branching in the molecules. The melt flow rate for the polystyrene with 0.05 percent VBCB is higher even though the molecular weight is higher. Chain extension presumably decreases the melt flow rate for the higher percentage VBCB.

When the method of this invention is used as in the General Styrene Polymerization Method hereinbefore, residual unreacted benzocyclobutene moieties may remain. Upon further heating these may react to further increase the molecular weight. This may be helpful when the modified polystyrene is subjected to additional heating which would tend to degrade and lower the molecular weight of normal polystyrene.

TABLE IV shows molecular weight changes as measured by size exclusion chromatography with on-line, low angle, laser light scattering detection. The samples were heated at the temperatures indicated in an oven under a nitrogen blanket so as to avoid oxidation.

TABLE IV

| | | Molecular weight after heat treating in nitrogen. | | | |
|---|---|---|---|---|---|
| | | Mw in 1,000s | | | |
| Wt % VBCB | Temperature °C. | 0 Min | 5 Min | 10 Min | 15 Min |
| 0.0 | 220 | 322 | 318 | 316 | 317 |
| 0.0 | 240 | 322 | 317 | 310 | 312 |
| 0.0 | 260 | 322 | 311 | 301 | 301 |
| 0.05 | 220 | 343 | 333 | 335 | 330 |
| 0.05 | 240 | 343 | 336 | 340 | 348 |
| 0.05 | 260 | 343 | 339 | 354 | 363 |

TABLE IV-continued

| | | Molecular weight after heat treating in nitrogen. | | | |
|---|---|---|---|---|---|
| | | Mw in 1,000s | | | |
| Wt % VBCB | Temperature °C. | 0 Min | 5 Min | 10 Min | 15 Min |
| 0.1 | 220 | 405 | 398 | 408 | 431 |
| 0.1 | 240 | 405 | 409 | 464 | 519 |
| 0.1 | 260 | 405 | 416 | 521 | 570 |

The data show that addition of VBCB retards or reverses the tendency for molecular weight breakdown as the modified polystyrene is exposed to temperatures which degrade the molecular weight of conventional polystyrene.

What is claimed is:

1. A process comprising:
    1) copolymerizing vinylbenzocyclobutene with styrene monomer through the vinyl moiety;
    2) subjecting the thus formed copolymer to conditions sufficient to open seventy percent of the side rings of the benzocyclobutene moieties;

wherein the amount of vinylbenzocyclobutene in the copolymer is from above 0.01 mole percent to about 0.15 weight percent and such that the polymer formed by step 2) does not reach a gel point.

2. The process of claim 1 wherein the copolymer contains from about 0.05 to about 0.15 weight percent vinylbenzocyclobutene.

3. The process of claim 2 wherein the side rings are opened for a chain coupling reaction by exposing the copolymer to a temperature of from about 150° to about 250° C.

4. A copolymer of vinylbenzocyclobutene with styrene polymerized through the vinyl moieties, wherein the amount of vinylbenzocyclobutene in the copolymer is from above 0.01 mole percent to about 0.15 weight percent and wherein if at least ninety percent of the side rings of the benzocyclobutene moieties were opened the copolymer would not reach a gel point.

5. The copolymer of claim 4 wherein the copolymer contains from about 0.05 to about 0.15 weight percent vinylbenzocyclobutene.

6. The copolymer of claim 5 wherein at least about ten percent of the side rings have been opened.

7. The copolymer of claim 6 wherein at least about fifty percent of the side rings have been opened.

8. The process of claim 7 wherein the side rings are opened for a chain coupling reaction by exposing the copolymer to a temperature of from about 150° C. to about 250° C.

9. A polymer made by a process comprising:
    1) copolymerizing vinylbenzocyclobutene with styrene monomer through the vinyl moiety;
    2) subjecting the thus formed copolymer to conditions sufficient to open seventy percent of the side rings of the benzocyclobutene moieties;

wherein the amount of vinylbenzocyclobutene in the copolymer is from about 0.05 to about 0.15 weight percent and such that the polymer formed by step 2) does not reach a gel point.

10. An article containing a component that contains a polymer made by a process comprising:
    1) copolymerizing vinylbenzocyclobutene with styrene monomer through the vinyl moiety;
    2) subjecting the thus formed copolymer to conditions sufficient to open seventy percent of the side rings of the benzocyclobutene moieties;

wherein the amount of vinylbenzocyclobutene in the copolymer is from about 0.05 to about 0.15 weight percent and such that the polymer formed by step 2) does not reach a gel point.

* * * * *